Nov. 9, 1926.
H. I. LEA ET AL
1,606,246
PROCESS OF TREATING HYDROCARBONS
Filed May 26, 1922
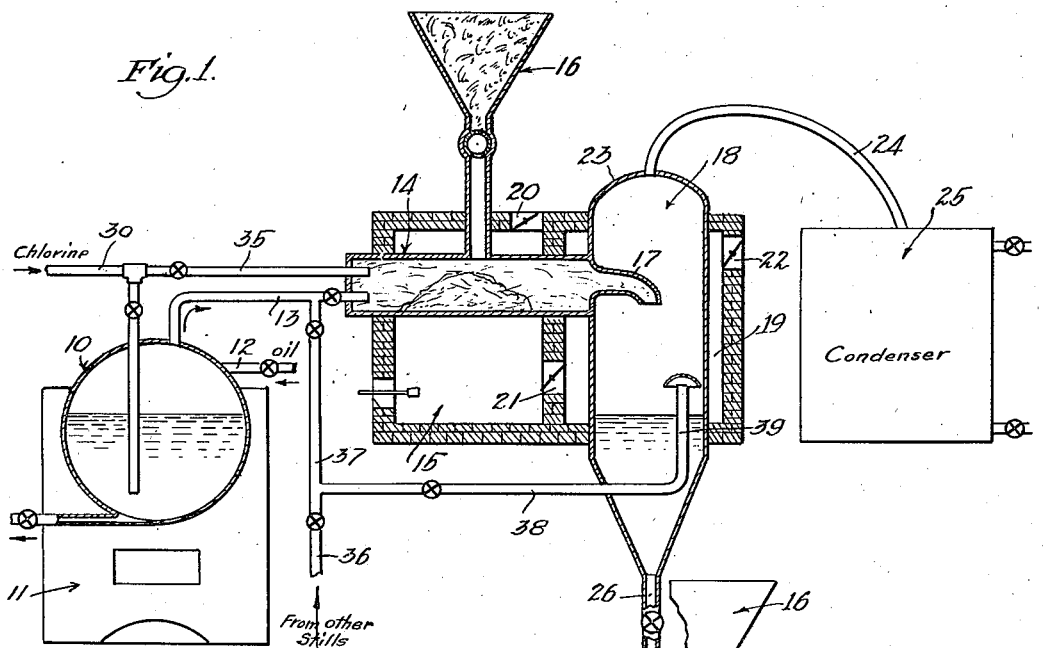
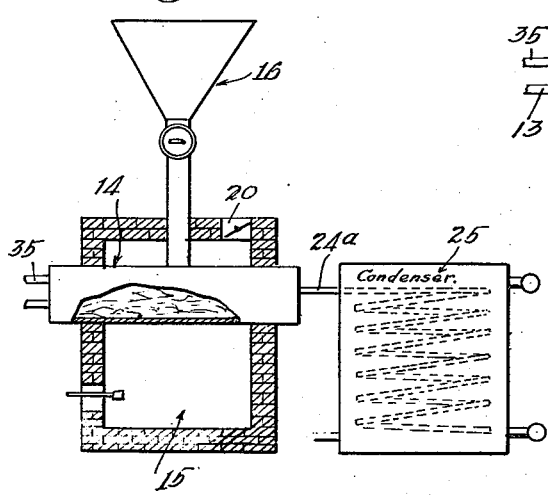
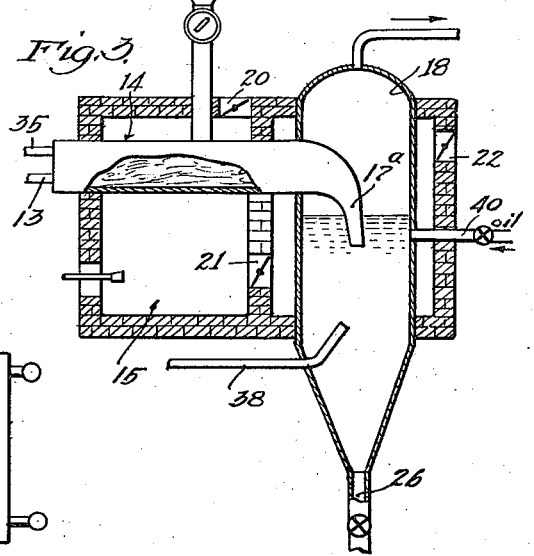
Inventors:
Henry I. Lea
Clifford W. Humphrey
By James T. Barkelew
their Attorneys Patented Nov. 9, 1926.

1,606,246

UNITED STATES PATENT OFFICE.

HENRY I. LEA, OF SANTA MONICA, AND CLIFFORD W. HUMPHREY, OF GLENDALE, CALIFORNIA.

PROCESS OF TREATING HYDROCARBONS.

Application filed May 26, 1922. Serial No. 563,796.

This invention has to do with treating hydrocarbon oils for the purpose of obtaining from them products of light specific gravity. These products according to our process may be either liquids or gases or both; certain control conditions being capable of variation so that the process may be turned into what would normally be known as a gas making process or capable of variation so that the process would become what is normally known as a cracking or distilling process for the purpose of obtaining light distillates. We therefore wish to have it distinctly understood that the invention relates broadly to the process in any of its variant forms and relates to the production of whatever various products may be taken from the process under different conditions of control.

It has been more or less common to treat the distilled or cracked vapors from hydrocarbon oils with aluminum chloride for the purpose of causing the recombination of the constituents into lighter forms. There have been very many difficulties in this kind of process and a part at least of those difficulties has been due to the difficulty of handling the aluminum chloride, as is well known. We have discovered that the aluminum chloride may be formed very economically in the same process in which the hydrocarbons are subjected to its action and simultaneously with that action; and by thus forming the aluminum chloride in its place of use we overcome previously encountered difficulties in the use of aluminum chloride. Furthermore, we, have found that by producing the aluminum chloride from the aluminum oxide, by chlorination in the presence of the hydrocarbons being treated, the reaction of aluminum chloride formation is also beneficial in several ways. Upon chlorination of the oxide oxygen is liberated and this oxygen unites with carbon of the hydrocarbons to form carbon monoxide which is a valuable product, and a certain amount of undesirable carbon used up. Furthermore, we have found that if the chlorine used for chlorinating the oxide is put through the original heating chamber in which the hydrocarbons are first distilled or cracked, the liberation of gases or vapors at any given temperature is very greatly increased. On the whole we have found that our process is capable of producing from a given quantity of hydrocarbon oil a very much increased quantity of light distillates or gases, or both; and that the process may be carried on at comparatively low temperatures and in comparatively simple apparatus and without the necessity of using any high pressures.

The process in its various forms will now be best understood from the following detailed description of forms which we now prefer, reference for this purpose being had to the accompanying drawings, in which:

Fig. 1 is a diagram illustrating one suitable form of apparatus for the process; Fig. 2 is a diagram showing another form of apparatus; and Fig. 3 is a diagram showing another form of apparatus.

In the drawings we show at 10 what may be an ordinary oil still located over a suitable heating furnace 11. Oil may be fed into this still at 12 and the gases and vapors produced pass out at 13 to a retort 14. This retort 14 may be of any suitable construction designed to withstand the heat of operation which however is not very high, running ordinarily at about a red heat or a low red heat. Retort 14 has a suitable heating furnace 15 and above the retort there is a feeding means 16 for aluminum oxide. The aluminum oxide more or less fills the retort and is subjected to the action of the hydrocarbon gases and vapors and to the action of chlorine introduced in the manner hereinafter described. The discharge spout 17 from the retort extends into and downwardly in a chamber 18 which we term a digester. This digester 18 is located in a side chamber 19 of furnace 15; and damper controls at 20, 21 and 22 provide means for controlling the temperatures in furnace chamber 19 more or less independently of the temperature in the main furnace chamber. Digester 18 is usually run at a temperature somewhat lower than that of the retort itself; and furthermore, the upper end surface 23 of the digester is exposed and may be provided with any suitable amount of radiating or conducting surface, so that the upper inner surface of the digester becomes a condensing surface to condense any liquids condensable below a certain temperature and to allow only the lower boiling point liquids to pass out through the vapor and gas pipe 24 to condenser 25 where the vapors are condensed and the gases and liquids then easily separated. The temperature at which the digester as a whole is kept may be regulated to allow only certain predetermined lighter hydrocarbons to pass over as vapor, keeping the heavier ones in the sludge, just as desired.

In the lower part of digester 18 there is an outlet 26 through which the sludge comprising heavy oils and chloride, etc. may be withdrawn.

In a simple form of operation, chlorine, either in its free form or in any combination suitable for the purpose (as for instance HCl), is introduced through pipe 30 into the still 10 so that it bubbles up through the liquid in the still. The introduction of the chlorine into this still during operation has the direct effect of very greatly increasing the amount of vaporization and the amount of gas production at any given temperature. The mixed vapors and gases including the chlorine pass through the pipe 13 into retort 14 and come into contact with the aluminum oxide and aluminum chloride therein. The oxide is introduced either continuously or from time to time, preferably in sufficient quantity to keep always present an excess of the oxide. The oxide in the retort being heated sufficiently, then the chlorine and the carbon of the hydrocarbons react on the oxide to form the chloride and carbon monoxide as follows:

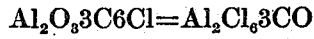

$$Al_2O_3 3C 6Cl = Al_2Cl_6 3CO$$

This carbon being taken from the hydrocarbon vapors has the very beneficial effect of largely reducing the amount of heavy hydrocarbons, tarry matter or free carbon that is ordinarily left or deposited in the usual distilling or cracking operation.

The hydrocarbon vapors and gases are then reacted upon by the aluminum chloride in such a manner (catalytic action) as to produce rearrangement of the hydrocarbons into comparatively lighter hydrocarbons. This action of the aluminum chloride is well known and needs no detailed description here. As a result of the whole process we thus have obtained a comparatively large volume of light hydrocarbon liquids and gases and have transformed that comparatively large volume of hydrocarbons into still lighter forms.

Now, generally speaking, from our present knowledge of this process, there will always be some liquids and some gases produced by the process. In a general way the control as to the predominance of gas production or liquid production is largely a matter of the proportion of chlorine introduced into the retort and therefore largely a matter of the proportion of aluminum chloride produced in the retort. By increasing the proportion of chlorine the gas production is increased; by decreasing the proportion of chlorine the liquid production is increased. This control as to relative production of gases and liquids is, of course, also somewhat affected by the temperatures used. In a general way the higher the temperature the greater the amount of gas production; and other things being equal, if temperatures are used high enough to crack the hydrocarbons then a large amount of gas will be produced. But it is to be noted that with the use of the chlorine, and in our process as described, we are able to produce gas in effective quantities without having to use the high temperatures that are ordinarily used in oil gas processes.

It may of course be the case that the amount of chlorine which we desire to put through the still 10 is not exactly the amount that we desire to put into the retort 14. Where we desire to put additional chlorine into the retort this may be done by passing chlorine through the pipe 35; and this may be the case where it is wished to produce predominantly gas. On the other hand where liquid production is desired, the amount of chlorine fed into still 10 may normally be more than is desired to put into the retort. In such a case we put all the chlorine from one still into the retort, in the manner above described; but we may then introduce gases and vapors from another still, or other stills, through a pipe 36 and thence through either or both branch pipes 37 and 38 into the line 13 or into the lower part of digester 18 through a stand pipe 39 whose upper end stands above the liquid level in the digester and is so arranged or protected that the sludge dropping out of spout 17 will not drop into pipe 39. Also, if desired, part of the vapors, etc. from still 10 may be by-passed around retort 14 to the digester, through pipes 37 and 38. It will be understood that the aluminum chloride in retort 14, at the temperature necessary for its formation, is in vapor form; and that when it emerges into digester 18 it may sublime as the temperature in digester 18 may be low enough to cause that action. If the digester temperature is low enough to cause condensation of the chloride, then separation of the vapors and gases from the chloride takes place in the digester. However, whether the chloride is in vapor or sublimed form in digester 18, the gases and vapors that are introduced into the digester are acted upon by the aluminum chloride; so that the whole volume of gases and vapors passing through the digester, from whatever sources, has been acted upon by the aluminum chloride before it passes out through pipe 24.

Among other advantageous features of this process we may particularly mention that the final product is effectively desulphurized.

If it is wished to put the process into operation for the purpose only of gas making then the retort 14 may discharge through pipe 24ª directly to the condenser 25, the digester not being necessary in this case (see Fig. 2). Whatever small amount of condensate there may be, together with the liquid sludge, may be easily separated from the gases, after condensation. In such an operation it may be, as we before said, desirable to introduce extra chlorine through the pipe 35 directly to retort 14 without passing through still 10. The oxide in that case is of course introduced in sufficient quantity to keep always an axcess of oxide present for the formation of the chloride.

Another variation of apparatus and process is illustrated in Fig. 3. Here the digester 18 is again used; but the main oil supply is put directly into the digester through pipe 40, a comparatively small amount of oil being put through still 10. It might be said that in this arrangement the main object of operating still 10 is to get a sufficient quantity of hydrocarbons into retort 14 to provide the carbon for the chlorination reaction there. And, in this form it will be noted that the treatment takes place in the liquid phase, rather than in the vapor phase as in the first described form. The liquid level in digester 18 is in this case maintained above the lower end of retort delivery spout 17ª; and all of the gases or vapors with the chloride, from spout 17ª bubble up through the liquid in the digester. The digester is kept at a temperature sufficient to vaporize the hydrocarbon oils; and the liquid hydrocarbon oils and the vapors in the digester are subjected to the action of the aluminum chloride as hereinbefore stated.

It may be desirable to agitate the liquids in the digester in any of the various process forms; and for that purpose we may use any suitable agitating means (for instance, a mechanical agitator); or we may, partially or wholly, agitate the liquids as in Fig. 3 by putting a sufficient quantity of gases and vapors through them from the spout 17ª.

If HCl is used instead of free chlorine; then in addition to the chlorinating and carbon oxidizing actions, the hydrogen may react with the hydrocarbons to increase their hydrogen content and thus further lighten them.

Having described a preferred form of our invention, we claim:

1. The process of treating hydro-carbons, that includes heating chlorine and hydrocarbons in vapor state in the presence of aluminum oxide, maintaining the temperature at that necessary to chlorinate the aluminum of the oxide, whereby aluminum chloride is formed by reaction between the chlorine, the oxide and carbon of the hydrocarbons, and the hydro-carbon vapor being present in excess over the amount required to supply carbon for the chloride forming reaction whereby the excess hydro-carbons are acted on in vapor state by the chloride as it is formed.

2. The process of treating hydro-carbons, that includes heating chlorine and hydrocarbons in vapor state in the presence of aluminum oxide, maintaining the temperature at that necessary to chlorinate the aluminum of the oxide and to crack the hydrocarbons, whereby aluminum chloride is formed by reaction between the chlorine, the oxide and carbon of the hydro-carbons, and the hydro-carbon vapor being present in excess over the amount required to supply carbon for the chloride forming reaction whereby the excess hydro-carbons are acted on in vapor state by the chloride as it is formed.

3. The process of treating hydro-carbons, that includes heating and vaporizing them while passing chlorine into them, and putting the resultant mixed hydro-carbon vapors and gases and chlorine gas into contact with aluminum oxide and maintaining all at a temperature sufficient to chlorinate the oxide to aluminum chloride, so that the chloride is produced in the presence of the hydro-carbon vapors and intimately mixed therewith for reaction thereon, and the hydro-carbon vapors being present in excess over the amount required for supplying carbon for the aluminum chloride forming reaction whereby the excess hydrocarbons are acted on in vapor state by the aluminum chloride as it is formed.

4. The process of treating hydro-carbons, that includes heating and vaporizing them while passing chlorine into them, and putting the resultant mixed hydro-carbon vapors and gases and chlorine gas into contact with aluminum oxide and maintaining all at a temperature sufficient to chlorinate the oxide to aluminum chloride, so that the chloride is produced in the presence of the hydro-carbons and intimately mixed therewith for reaction thereon, and then putting further hydro-carbons into contact with the mixture of vapors, gases and aluminum chloride produced.

5. The process of creating hydro-carbons, that includes heating chlorine and hydrocarbons in vapor state in the presence of aluminum oxide, maintaining the temperature at that necessary to chlorinate the aluminum of the oxide, whereby aluminum chloride is formed by reaction between the chlorine, the oxide and carbon of the hydrocarbons, and the hydro-carbon vapor being present in excess over the amount required to supply carbon for the chloride forming reaction whereby the excess hydro-carbons are acted on in vapor state by the chloride as it is formed, and thereafter reducing the temperature of the mixed vapors and gases to liquefy the higher boiling point hydrocarbons and sublime the aluminum chloride so that such liquefied hydro-carbons are acted upon in liquid form by the aluminum chloride.

In witness that we claim the foregoing we have hereunto subscribed our names this 19th day of May 1922.

HENRY I. LEA.
CLIFFORD W. HUMPHREY.